US009300487B1

(12) United States Patent
Anpat et al.

(10) Patent No.: US 9,300,487 B1
(45) Date of Patent: Mar. 29, 2016

(54) RE-ESTABLISHING A DIRECT TUNNEL BETWEEN AN ACCESS NODE AND A GATEWAY ROUTER

(75) Inventors: Sourabh Anpat, London (GB); Laurence Lautier, Plaisir (FR); Michael Brown, McKinney, TX (US)

(73) Assignee: Apple Inc., Cupertino, CA (US)

( * ) Notice: Subject to any disclaimer, the term of this patent is extended or adjusted under 35 U.S.C. 154(b) by 1359 days.

(21) Appl. No.: 12/006,116

(22) Filed: Dec. 31, 2007

Related U.S. Application Data

(60) Provisional application No. 60/888,390, filed on Feb. 6, 2007.

(51) Int. Cl.
*H04L 12/28* (2006.01)

(52) U.S. Cl.
CPC ....................................... *H04L 12/28* (2013.01)

(58) Field of Classification Search
USPC .......................................................... 370/329
See application file for complete search history.

(56) References Cited

U.S. PATENT DOCUMENTS

| 6,046,978 | A | 4/2000 | Melnik | |
|---|---|---|---|---|
| 6,104,929 | A | 8/2000 | Josse | |
| 7,536,187 | B2 | 5/2009 | Oswal | |
| 2002/0004395 | A1* | 1/2002 | Forssell | 455/433 |
| 2002/0023210 | A1* | 2/2002 | Tuomenoksa et al. | 713/161 |
| 2003/0189914 | A1 | 10/2003 | Zhao | |
| 2004/0053607 | A1 | 3/2004 | Ronneke | |
| 2004/0053623 | A1* | 3/2004 | Hoff et al. | 455/452.1 |
| 2004/0203754 | A1 | 10/2004 | Yi-Bing | |
| 2005/0201371 | A1* | 9/2005 | Lauer | 370/389 |
| 2006/0050667 | A1 | 3/2006 | Verma | |
| 2006/0062145 | A1 | 3/2006 | Kirla | |
| 2006/0274688 | A1 | 12/2006 | Maxwell | |
| 2007/0049278 | A1 | 3/2007 | Lindoff | |
| 2007/0213058 | A1* | 9/2007 | Shaheen | 455/436 |
| 2008/0186912 | A1* | 8/2008 | Huomo | 370/329 |
| 2009/0213784 | A1* | 8/2009 | Ang | 370/328 |

OTHER PUBLICATIONS

VMU9000, Firmware Version: 1.01.048w Date: May 10, 2005 wmu-9000VPN.pdf, 6 pages.*
3GPP, "UTRA-UTRAN Long Term Evolution (LTE) and 3GPP System Architecture Evolution (SAE)," http://www.3gpp.org/Highlights/LTE/LTE.htm, pp. 1-8 (at least as early as Dec. 16, 2007).
3GPP TS 23.060 V7.6.0 (Dec. 2007), 3$^{rd}$ Generation Partnership Project; Technical Specification Group Services and System Aspects; General Packet Radio Service (GPRS); Service description; Stage 2 (Release 7), pp. 1-217 (2007).

(Continued)

*Primary Examiner* — Sulaiman Nooristany
(74) *Attorney, Agent, or Firm* — Meyertons, Hood, Kivlin, Kowert & Goetzel, P.C.

(57) ABSTRACT

To re-establish a direct tunnel between an access node and a gateway router in a wireless network, a control node that provides mobility management on behalf of mobile stations detects restart of the gateway router. In response to detecting restart of the gateway router, the control node sends context information regarding a previously established direct tunnel to the gateway router to enable the gateway router to re-establish the direct tunnel.

17 Claims, 2 Drawing Sheets

(56) References Cited

OTHER PUBLICATIONS

3GPP TS 23.401 V8.0.0 (Dec. 2007), 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 8); pp. 1-167 (2007).

3GPP TS 23.402 V1.4.0 (Oct. 2007), 3$^{rd}$ Generation Partnership Project; Technical Specification Group Services and System Aspects; Architecture Enhancements for non-3GPP accesses (Release 8); pp. 1-125 (2007).

3GPP TR 23.809 V1.0.0 (Sep. 2006), 3$^{rd}$ Generation Partnership Project; Technical Specification Group Services and System Aspects; One Tunnel Functional description; (Release 7); pp. 1-50 (2006).

3GPP TS 29.060 V8.1.0 (Sep. 2007), 3$^{rd}$ Generation Partnership Project; Technical Specification Group Core Network and Terminals; General Packet Radio Service (GPRS); GPRS Tunnelling Protocol (GTP) across the Gn and Gp interface (Release 8); pp. 1-143 (2007).

Bennett et al., U.S. Appl. No. 11/510,540 entitled Bicasting Traffic Data During a Handover filed Aug. 25, 2006 (24 pages).

* cited by examiner

RE-ESTABLISHING A DIRECT TUNNEL BETWEEN AN ACCESS NODE AND A GATEWAY ROUTER

CROSS-REFERENCE TO RELATED APPLICATIONS

This application claims the benefit under 35 U.S.C. §119 (e) of U.S. Provisional Application Ser. No. 60/888,390, entitled "One Tunnel Re-Establishment Procedure Between a GGSN and an SGSN," filed Feb. 6, 2007, which is hereby incorporated by reference.

TECHNICAL FIELD

The invention relates to re-establishing a direct tunnel between an access node and a gateway router.

BACKGROUND

In wireless communication networks that support communication of packet-switched traffic (e.g., web browsing, electronic mail, voice over Internet Protocol, video over Internet Protocol, etc.), various nodes are provided to enable such communications between mobile stations and an external packet-switched network, such as an Internet Protocol (IP) network. Examples of wireless networks that support communication of packet-switched traffic include those that operate according to the GSM (Global System for Mobile Communications) and UMTS (Universal Mobile Telecommunications System) standards, as defined by the Third Generation Partnership Project (3GPP).

According to the 3GPP standards, a GERAN (GSM EDGE Radio Access Network) that includes base stations and base station controllers is provided to enable wireless access by mobile stations. The 3GPP standards also provide for UMTS Terrestrial Radio Access Networks (UTRANs), which include node-Bs (which are equivalents of base stations) and radio network controllers (which are equivalents of base station controllers) to enable wireless access by mobile stations. In some wireless networks, both GERANs and UTRANs may be present.

The GERAN and/or UTRAN is (are) connected to a Serving GPRS (General Packet Radio Services) support node (SGSN), which can perform the following tasks: packet routing and transfer, mobility management (attach/detach mobile stations and location management), logical link management, and authentication and charging functions. The SGSN is in turn connected to a gateway GPRS support node (GGSN), which acts as the interface between the SGSN and an external packet data network (either a radio network or an IP network). The GGSN converts packets received from the SGSN into the appropriate format, and sends such packets to the external packet data network. Similar conversion is performed in the return path.

Traditionally, when a session is established between a mobile station and another network entity, data packets exchanged between the mobile station and the other network entity are tunneled (encapsulated) through the wireless core network. The traditional architecture establishes a tunnel between the GGSN and the SGSN, and another tunnel between the SGSN and the radio network controller/base station controller. In other words, two tunnels are established for a mobile station session. Under this traditional arrangement, all data packets have to pass through the SGSN, which has to terminate one tunnel, extract a packet, and place the packet into another tunnel. Such processing by the SGSN consumes valuable resources at the SGSN, and can be a source of bottleneck if there are a large number of sessions that the SGSN has to manage.

To address this issue, the 3GPP standards have defined a mechanism to establish a direct tunnel (sometimes referred to as a "one tunnel") between the radio network controller/base station controller and the GGSN, which allows the SGSN to be bypassed. Note, however, that control functions such as mobility management still remain with the SGSN such that the SGSN remains responsible for modifying the direct tunnel in response to detecting that the mobile station has moved to coverage areas of different radio network controllers/base station controllers.

Conventionally, when the GGSN is restarted (such as due to temporary failure, maintenance, and so forth), the SGSN would receive either an error indication from the GGSN indicating that the resource is not available in the GGSN, or an indication that the GGSN has restarted. In response, the SGSN would mark the associated session information invalid, and may start a procedure to deactivate the session. Subsequently, the mobile station would then have to activate a new session, which may cause substantial overhead that places a load on the wireless communications network.

SUMMARY OF THE INVENTION

In general, according to preferred embodiments of the invention, a method of re-establishing a direct tunnel between an access node and a gateway router includes detecting, at a control node that provides mobility management on behalf of mobile stations, restart of the gateway router. In response to detecting restart of the gateway router, the control node sends context information regarding a previously established direct tunnel to the gateway router to enable the gateway router to re-establish the direct tunnel.

Other or alternative features will become apparent from the following description, from the drawings, and from the claims.

DETAILED DESCRIPTION OF PREFERRED EMBODIMENTS OF THE INVENTION

Figure 1:
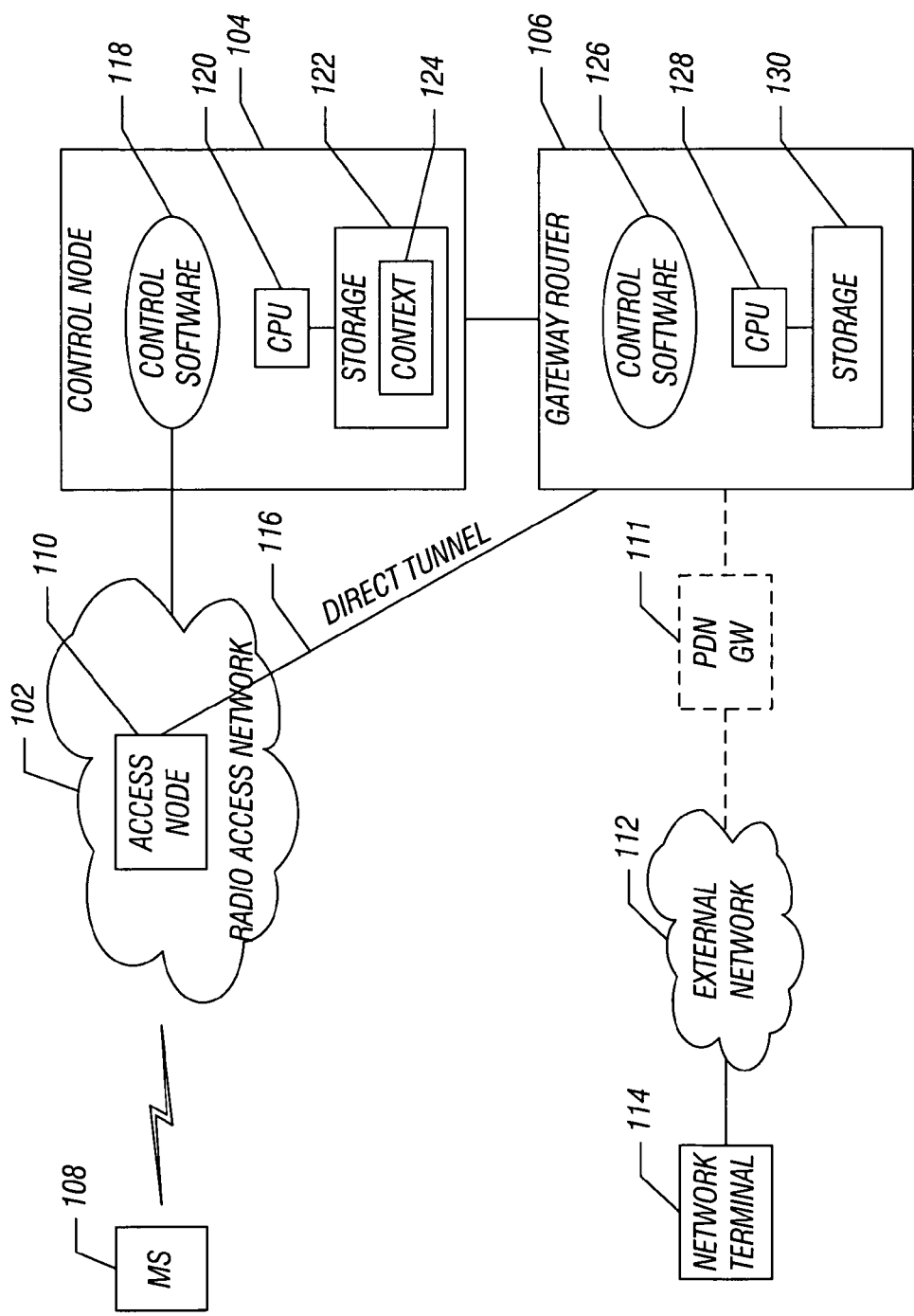
FIG. 1 is a block diagram of a communications network that includes a wireless core network in which a direct tunnel can be established, according to preferred embodiments of the invention.

In the following description, numerous details are set forth to provide an understanding of preferred embodiments of the invention. However, it will be understood by those skilled in the art that some embodiments of the invention may be practiced without these details and that numerous variations or modifications from the described embodiments may be possible.

In general, according to preferred embodiments of the invention, techniques or mechanisms are provided to enable re-establishment of a direct tunnel (previously established) between an access node and a gateway router in response to detecting that the gateway router has been restarted. An "access node" refers to a node that enables wireless access of a network by mobile stations. According to Third Generation Partnership Project (3GPP) standards, the access node can be part of a GSM EDGE (Global System for Mobile Communications Enhanced Data Rates for GSM Evolution) radio access network (GERAN) or a UMTS (Universal Mobile Telecommunications System) terrestrial radio access network (UTRAN). An access node can be a base station controller (BSC) or a radio network controller (RNC). In the ensuing discussion below, reference is made to "radio network controller" or "RNC." However, note that reference to "radio network controller" or "RNC" is also intended to cover base station controller or BSC.

A "gateway router" terminates the user plane interface towards the access node and assumes the responsibility for packet routing and transfer. In the 3GPP context, one example gateway router is a gateway GPRS (General Packet Radio Services) support node (GGSN). In the case of the GGSN, the gateway router is the interface between the wireless core network and external packet data network (either an external radio network or an IP (Internet Protocol) network). Alternatively the gateway router may be an intermediate node with functions such as being the mobility anchor point or providing the packet routing and transfer task for another subsequent node connected to an external packet data network.

Although reference is made to 3GPP network nodes in the ensuing discussion, it is noted that techniques or mechanisms according to some embodiments can be applied to network nodes of wireless networks according to other standards.

For improved efficiency, a direct tunnel can be established between an access node and a gateway router for a session between a mobile station attached to the access node and another endpoint. A direct tunnel allows traffic packets to be communicated directly between the access node and the gateway router without having to flow through an intermediate control node, such as the serving GPRS support node (SGSN) in the 3GPP context. More generally, a "direct tunnel" refers to a path or route established between two network nodes for routing traffic packets, where an intermediate node for converting or translating the traffic packets between the two nodes does not have to be provided. Note that a direct tunnel between two network nodes can pass through one or more intervening routers or switches.

An example of the "intermediate node" referred to above is a control node such as an SGSN. In general, a control node provides various functions, including at least mobility management on behalf of mobile stations. Mobility management refers to managing movement of mobile stations between different access nodes. Also, mobility management can refer to location management to keep track of a location of a mobile station. Other tasks that can be performed by the control node include logical link management, authentication, and charging tasks.

A direct tunnel established between an access node and a gateway router that bypasses the control node allows for more efficient communication of traffic packets. Traditionally, according to 3GPP standards, traffic packets have to be routed through the SGSN by establishing a first tunnel between the access node and the control node, and a second tunnel between the control node and the gateway router. However, by establishing a direct tunnel, the control node can be bypassed for communicating traffic packets. Note, however, that control messages for call establishment and management are still handled by the control node. Generally, a discussion of GPRS services is provided in 3GPP TS 23.060, along with other 3GPP standards documents.

More recently, further development of the 3GPP standards have been performed to improve upon existing 3GPP standards. Such improvements are referred to as 3GPP LTE (long term evolution). In the LTE context, the gateway router is referred to as a serving gateway, and the control node is referred to as a mobility management entity (MME). A description of LTE is provided in 3GPP TS 23.401 and 23.402. Note that, in the LTE context, direct tunnels can also be established between an access node and a serving gateway that bypasses the MME.

A direct tunnel can be sometimes referred to as "one tunnel," such as in 3GPP TR 23.809. More specifically, the direct tunnel functionality enables a direct user plane between an access node in the radio access network and a GGSN within a packet-switched domain. In the LIE context, direct tunnels can also be provided, as described in 3GPP TS 23.401.

If a gateway router, such as the GGSN or the serving gateway, should restart for any reason, such as due to failure, fault, maintenance, and so forth, then any direct tunnels established with this gateway router may become lost or may not function properly. A gateway router "restarting" refers to any of the following: (1) the gateway router power cycling; (2) the gateway router rebooting; (3) the gateway router resetting; and (4) other forms of restarts.

In accordance with preferred embodiments of the invention, techniques or mechanisms are provided to enable re-establishment of direct tunnels upon detection of restart of the gateway router. The re-establishment procedure(s) is (are) relatively efficient and allow(s) for direct tunnels to be re-established after gateway router restart with reduced overhead compared to conventional techniques.

In some preferred embodiments of the invention, a "session" established between a mobile station and a wireless core network is referred to as a PDP (Packet Data Protocol) context that includes multiple parts. For control, context information is stored in the mobile station, access node (for active sessions), control node (SGSN or MME), and the gateway router. Active sessions are further represented by a radio bearer established between the mobile station and access node. The data path between the mobile station and wireless core is managed by tunnels. The preferred embodiments of the invention allows the re-establishment of the tunnels within the wireless core network without any perceived interruption in the previously established radio bearer between the access node and the mobile station.

In some preferred embodiments of the invention, the direct tunnel re-establishment procedure is performed using a Create PDP (Packet Data Protocol) Context Request/Response procedure. The Create PDP Context Request/Response procedure can be based on an existing procedure with modifications to allow additional information to be carried in the Create PDP Context Request/Response messages. In other implementations, other types of messaging can be used for re-establishing direct tunnels according to some embodiments.

The direct tunnel re-establishment procedure is based on context information stored in the control node (such as PDP context information) and communicated from the control node to the gateway router when the access node detects that the gateway router has been restarted. Context information can be present in both the control node (SGSN or MME) and the gateway router (GGSN or serving gateway), and can contain various session information associated with a session of a mobile station. Examples of the session information include the IP address of the mobile station, access point name or APN, data plane address (for both the access node and gateway router), data path identifier (e.g., tunnel endpoint identifier or TEID) of the access node, quality of service information, and other information. The direct tunnel can be established between the transport layer address (including both the data plane address and data path identifier) for user traffic of the access node and the transport layer address for user traffic of the GGSN, for example.

When a mobile station desires to use a wireless network, the mobile station first attaches to the wireless network and activates a PDP context. Activation of a PDP context can be initiated by the mobile station, such as by the mobile station sending an Activate PDP Context Request message to the control node (SGSN or MME). In response to this PDP Context activation request, the control node (SGSN or MME) sends a Create PDP Context Request message to the gateway router (GGSN or serving gateway). In response, the gateway router (GGSN or serving gateway) allocates an IP address and returns the IP address (and other information) to the control node (SGSN or MME) in a Create PDP Context Response message. Such information is then forwarded to the mobile station in an Activate PDP Context Accept message.

Information about a gateway router restart can be conveyed to the control node using any one of the following messages: (a) Create PDP Context Response message; (b) Update PDP Context Response message; (c) Echo Response message; or some other message. Each of these messages can contain a recovery information field that can provide notification that the sending node has restarted. By receiving any of the above messages containing the recovery information field, the control node is able to detect when the gateway router has been restarted, such that the control node can take appropriate steps to re-establish one or more direct tunnels that have been previously established with the gateway router.

FIG. 1 shows an example communications network that includes a wireless core network that has a radio access network 102, a control node 104 (e.g., SGSN or MME), and a gateway router 106 (e.g., GGSN or serving gateway). Note that other nodes can also be part of the wireless core network.

A mobile station 108 is able to perform wireless access through the radio access network 102, which includes multiple access nodes 110 (e.g., RNCs). Although not depicted, the radio access network 102 also includes base stations or access points to perform wireless communications (e.g., radio frequency communications) with the mobile station 108.

The gateway router 106 is coupled to an external network 112 (e.g., external radio network or packet data network), which is connected to one or more network terminals 114. If the gateway router 106 is a GGSN, then the gateway router 106 is connected to the external network 112. However, if the gateway router 106 is a serving gateway, then the gateway router 106 is connected to a packet data network (PDN) gateway 111, which is in turn connected to the external network 112.

As noted above, for a session of the mobile station 108, a direct tunnel 116 can be established between the access node 110 and the gateway router 106, with the direct tunnel 116 bypassing the control node 104. Traffic packets of the mobile station session can be communicated through the direct tunnel 116.

The control node 104 has control software 118 for performing the various tasks of the control node, as discussed herein. The control software 118 is executable on one or more central processing units (CPUs) 120. The CPU(s) 120 is (are) connected to a storage 122, which can store context information 124 associated with sessions of mobile stations.

The gateway router 106 also includes control software 126 executable on one or more CPUs 128 for performing tasks of the gateway router 106. The CPU(s) 128 is (are) connected to a storage 130. Although not shown, the storage can also store context information associated with sessions of mobile stations.

Figure 2:
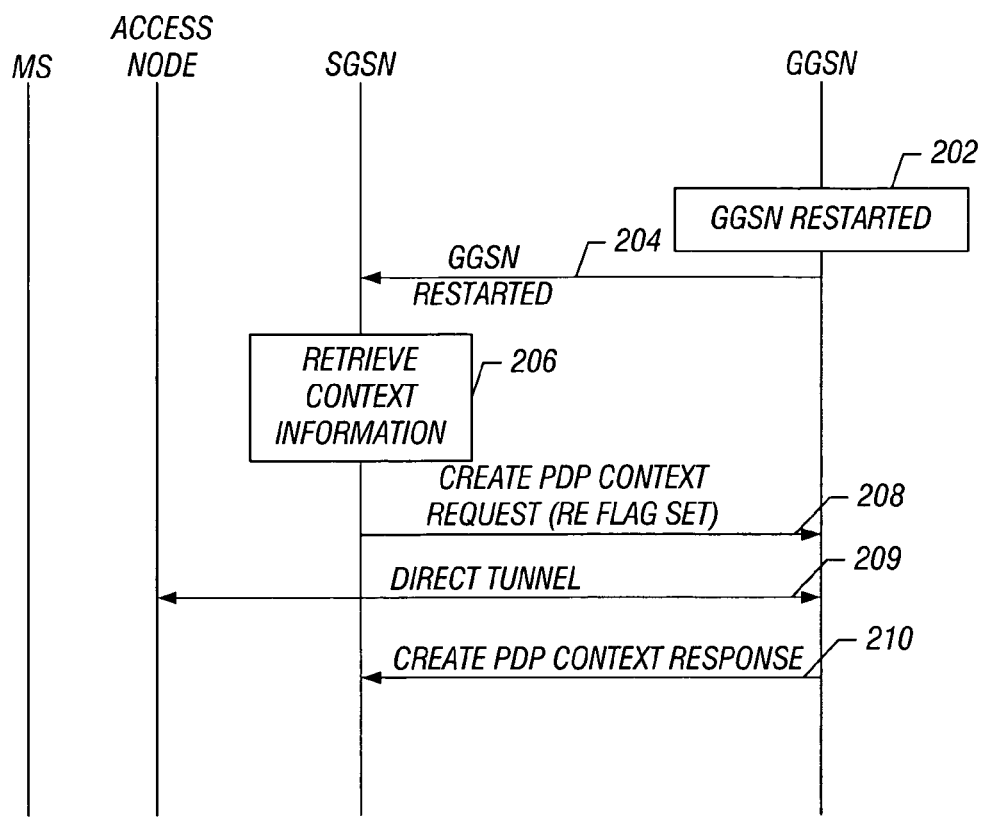
FIGS. 2 and 3 are message flow diagrams depicting direct tunnel re-establishment procedures in response to detecting restart of a gateway router, in accordance with preferred embodiments of the invention.

FIG. 2 is a flow diagram depicting the steps involved in performing direct tunnel re-establishment according to a preferred embodiment of the invention. Although reference is made to messaging between an SGSN and GGSN, note that the same or similar messaging can be exchanged between an MME and serving gateway in the LTE context. The GGSN is restarted (at 202), for any of various possible reasons as noted above. At some point after GGSN restart, the GGSN sends (at 204) a message to the SGSN to inform the SGSN that the GGSN has restarted. The fact that the GGSN has restarted can be communicated by use of the recovery information field in any of various messages that can be sent from the GGSN to the SGSN. Any message that contains such a recovery information field can be used, including any message that is a response message to a request from the SGSN, or any GGSN-initiated message. As mentioned above, various examples of messages that contain the recovery information field include Create PDP Context Response, Update PDP Context Response, and Echo Response. Other messages from the GGSN can also contain the recovery information field to notify the SGSN that the GGSN has restarted. The recovery information field can be set to a particular value to indicate that the GGSN has restarted.

In response to detecting that the GGSN has restarted, the SGSN retrieves (at 206) the relevant context information associated with a session for which a direct tunnel has been established.

In accordance with preferred embodiments of the invention, the SGSN then sends (at 208) a Create PDP Context Request message, which contains a re-establishment flag set to indicate that the Create PDP Context Request message has been sent for re-creating a direct tunnel using existing context information. The re-establishment flag can be added as an additional information element or to an existing information element. This is contrasted to a Create PDP Context Request message (without the re-establishment flag) that is sent to create a new PDP context. Creating a new PDP context would involve negotiating QoS, allocating a new IP address and APN, downloading policy information, and other tasks. However, re-creating a direct tunnel avoids the above tasks. Instead, re-creating the direct tunnel is based on the context information stored at the SGSN and communicated to the GGSN in the Create PDP Context request at 208.

Once the direct tunnel has been re-established (at 209), the GGSN returns (at 210) a Create PDP Context Response message to the SGSN indicating successful re-establishment of the direct tunnel between the access node and the GGSN.

Figure 3:
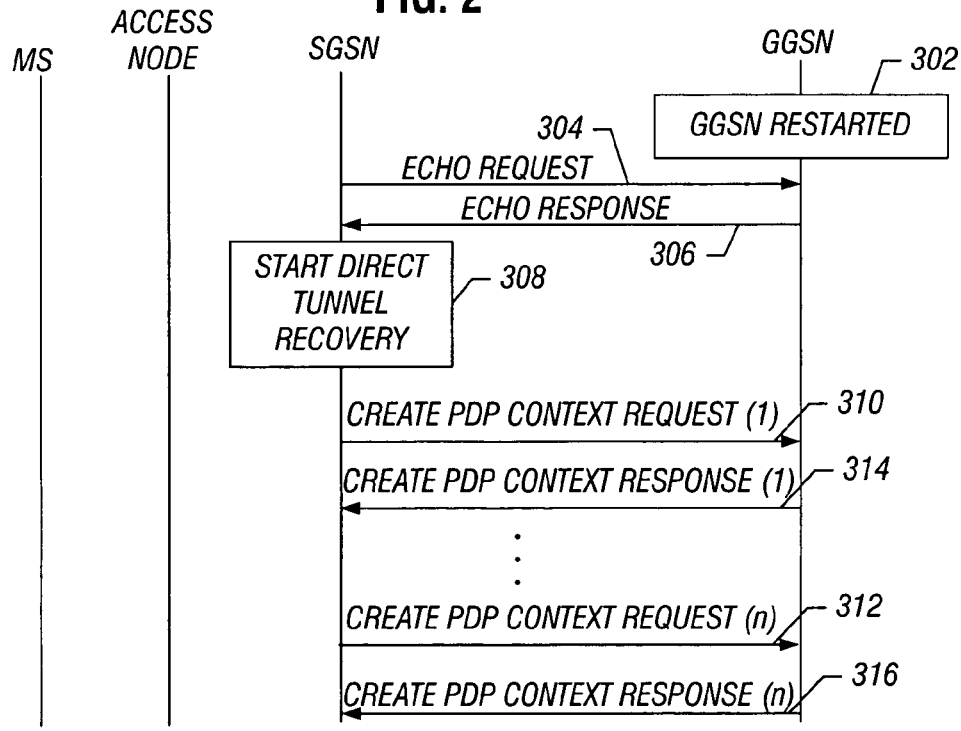

FIG. 3 shows a message flow diagram depicting the steps involved in another preferred embodiment of direct tunnel re-establishment. Note again that although reference is made to SGSN and GGSN, the same or similar procedure can be provided between an MME and serving gateway in the LTE context. In this example, it is assumed that the GGSN restart is a partial or modular GGSN restart, which refers to a portion or module of the GGSN restarting (rather than the entire GGSN restarting). One portion or module of the GGSN restarting is an indication that other portions or modules of a GGSN may also be restarting. The ability to detect partial/modular GGSN restart allows for early detection of the imminent GGSN restart (where all modules of the GGSN have been restarted). Detecting the partial/modular GGSN restart can be based on sending an Echo Request message (at 304) from the SGSN to the GGSN, in one example implementation. In response, the GGSN sends (at 306) an Echo Response message, where the Echo Response message contains a recovery information field (having a particular value) that indicates that the GGSN (or some portion or module of the GGSN) has restarted.

The SGSN then starts (at 308) the direct tunnel recovery procedure, even though it may have just detected a partial or modular GGSN restart. The SGSN can go through all of its active PDP contexts to detect which of them had established a direct tunnel. The relevant PDP contexts are those having a tunnel (e.g., GTP-U or GTP user data plane tunnel) with an endpoint having a GGSN address identifying the GGSN that is restarting. The direct tunnel recovery procedure is performed for the affected PDP contexts.

For each of the identified sessions associated with the affected PDP context, the SGSN sends a corresponding Create PDP Context Request message (310, 312). Each of these Create PDP Context Request messages contains context information for the corresponding sessions for which direct tunnel re-establishment is being performed (direct tunnels not depicted in FIG. 3 for brevity). Each Create PDP Context Request message also contains a re-establishment flag to indicate that the Create PDP Context Request is being used for re-establishing a direct tunnel.

In response to each of the Create PDP Context Request messages, a Create PDP Context Response message is sent (at 314, 316).

In some embodiments, to avoid overloading a recently restarted GGSN, the SGSN can specify that a predetermined number of Create PDP Context Request messages can be outstanding at one time. The predetermined number can be one or greater. Once this predetermined number of Create PDP Context Request messages are outstanding, additional Create PDP Context Request messages are not sent for re-establishing other direct tunnels until a response message is received for an existing Create PDP Context Request message.

By using the direct tunnel re-establishment procedure according to preferred embodiments of the invention, more simplified and faster recovery is achieved when a GGSN undergoes restart. Also, the simplified and fast recovery results in reduced signaling and load on the mobile station, control node, and gateway router. Also, service loss to mobile stations involved is reduced or eliminated.

Instructions of software (such as the control software 118 or 126 in FIG. 1) are loaded for execution on a processor. The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of reestablishing a direct tunnel between an access node and a gateway router in a wireless network, comprising:
   a control node performing, establishing the direct tunnel between the access node and the gateway router, wherein the control node provides mobility management on behalf of mobile stations;
   detecting restart of the gateway router; and
   in response to detecting restart of the gateway router, sending context information regarding the previously established direct tunnel to the gateway router to enable the gateway router to re-establish the direct tunnel;
   wherein the control node comprises one of a serving GPRS support node (SGSN) and mobility management entity (MME), and the gateway router comprises one of a gateway GPRS support node (GGSN) and serving gateway.

2. The method of claim 1, wherein sending the context information comprises sending at least one message containing an indicator that the at least one message is for re-establishment of the direct tunnel.

3. The method of claim 2, wherein sending the at least one message comprises sending a Create PDP Context Request message containing the context information.

4. The method of claim 1, wherein sending the context information comprises sending at least an Internet Protocol (IP) address previously allocated to the mobile station, gateway router address used in the previously established direct tunnel, and an address of the access node.

5. The method of claim 4, wherein sending the context information further comprises sending information relating to an access point name and negotiated quality of service.

6. The method of claim 1, wherein the control node detecting that the gateway router has restarted comprises the control node receiving a message from the gateway router containing a recovery information element that indicates restart of the gateway router.

7. The method of claim 2, wherein the message comprises one of a Create PDP Context Response message, an Update PDP Context Response message, and an Echo Response message.

8. A gateway router, comprising:
   a processor to:
   establish a direct tunnel with an access node in a wireless network;
   send a first message to a control node in response to restart of the gateway router, wherein the first message contains an indicator that the gateway router has restarted, wherein the control node provides mobility management on behalf of mobile stations;
   receive a second message from the control node containing context information for the direct tunnel; and
   in response to receiving the second message, re-establish the direct tunnel with the access node using the context information;
   wherein the gateway router comprises one of a gateway GPRS support node (GGSN) and a serving gateway, and wherein the control node comprises one of a serving GPRS support node (SGSN) and a mobility management entity (MME).

9. The gateway router of claim 8, wherein the first message comprises one of an Echo message, Create PDP Context Response message, and Update PDP Context Response message.

10. The gateway router of claim 8, wherein the second message comprises a Create PDP Context Request message having a flag indicating that the Create PDP Context Request message is to re-establish the direct tunnel.

11. A network system comprising:
an access node;
a control node; and
a gateway router, wherein a direct tunnel is established between the access node and the gateway router, and wherein the control node is configured to: detect restart of the gateway router; in response to restart of the gateway router, send context information for the direct tunnel to the gateway router; and
wherein the gateway router is configured to: re-establish the direct tunnel based on the context information received from the control node;
wherein the control node comprises one of a serving GPRS support node (SGSN) and mobility management entity (MME), and the gateway router comprises one of a gateway GPRS support node (GGSN) and serving gateway.

12. The network system of claim 11, wherein additional direct tunnels are established between the access node and the gateway router, and wherein the control node is configured to:
in response to restart of the gateway router, send additional context information for the additional direct tunnels to the gateway router, wherein the gateway router is configured to re-establish the additional direct tunnels using the additional context information.

13. The network system of claim 11, wherein the control node detects restart of the gateway router based on receiving a first message containing an information element indicating that the gateway router has restarted.

14. The network system of claim 13, wherein the first message is responsive to a second message sent by the control node to the gateway router.

15. A method comprising:
establishing a direct tunnel between an access node and a gateway router in a wireless network, wherein the direct tunnel is established in cooperation with a control node, wherein the direct tunnel carries traffic of a session of a mobile station, wherein the control node provides mobility management on behalf of mobile stations;
in response to the gateway router restarting, the control node sending context information to the gateway router; and
in response to receiving the context information from the control node, the gateway router re-establishing the direct tunnel using the context information;
wherein the control node comprises one of a serving GPRS support node (SGSN) and mobility management entity (MME), and the gateway router comprises one of a gateway GPRS support node (GGSN) and serving gateway.

16. The method of claim 15, wherein the control node sending the context information comprises sending at least an Internet Protocol (IP) address of the mobile station.

17. The gateway router of claim 8, wherein the processor is configured to send the second message in response to receiving the first message.

\* \* \* \* \*